United States Patent [19]
Nishikawa et al.

[11] Patent Number: 4,785,684
[45] Date of Patent: Nov. 22, 1988

[54] VEHICLE STEERING MECHANISM

[75] Inventors: Masumi Nishikawa, Toyoake; Hiroshi Watanabe, Nagoya, both of Japan

[73] Assignee: Aisin Seiki Kabushiki Kaisha, Japan

[21] Appl. No.: 98,958

[22] Filed: Sep. 21, 1987

[30] Foreign Application Priority Data

Sep. 30, 1986 [JP] Japan .................. 61-231936
Sep. 30, 1986 [JP] Japan .................. 61-231937

[51] Int. Cl.⁴ .................. B62D 1/18; F16H 25/24
[52] U.S. Cl. .................. 74/493; 74/89.15; 280/775
[58] Field of Search .................. 74/89.15, 493; 280/775

[56] References Cited

U.S. PATENT DOCUMENTS 3,252,350  5/1966  Zeigler .................. 74/493
4,503,504  3/1985  Suzumura et al. .................. 74/493 X
4,602,520  7/1986  Nishikawa et al. .................. 74/493
4,633,732  1/1987  Nishikawa et al. .................. 74/493
4,669,325  6/1987  Nishikawa et al. .................. 74/493 X

FOREIGN PATENT DOCUMENTS 58-33570  2/1983  Japan .................. 74/493
58-191668  11/1983  Japan .................. 74/493

Primary Examiner—Allan D. Herrmann
Attorney, Agent, or Firm—Finnegan, Henderson, Farabow, Garrett & Dunner

[57] ABSTRACT

A tiltable and telescopically extensible steering shaft assembly includes a lower main shaft journalled by a stationary bracket and an upper main shaft assembly including a first shaft portion telescopically connected with the lower main shaft through splines and a second shaft portion connected with the first shaft portion for pivotable movements with respect thereto through a universal joint. The stationary bracket carries a first screw shaft and one or more second screw shafts for rotation and engaged with first and second nuts, respectively. An upper bracket is provided on the second shaft portion of the upper shaft assembly and connected with the second nuts for pivotable movements about a transverse tilting axis passing through the pivot point of the universal joint. The first nut is carried by the upper bracket so that a rotation of the first screw shaft produces a tilting movement of the second shaft portion of the upper shaft assembly and rotations of the first and second screw shafts produce a telescopic movement of the upper shaft assembly.

7 Claims, 4 Drawing Sheets

VEHICLE STEERING MECHANISM

BACKGROUND OF THE INVENTION

1. Field of the Invention

The present invention relates to a vehicle steering mechanism and more particularly to a tiltable and telescopically extensible steering shaft mechanism for a vehicle steering mechanism.

2. Description of the Prior Art

A vehicle steering system having a tiltable and telescopically extensible steering shaft mechanism has been known for example by the Japanese laid-open patent application No. 58-33569. In the known type of the steering system, the steering shaft assembly includes an lower main shaft and an upper main shaft which are telescopically connected together through splines. The lower main shaft is supported at the lower end portion for tilting pivotable movements by a break-away bracket which is mounted on the vehicle body. The upper main shaft is held by a first upper bracket and the lower main shaft is further held at a position upwards the break-away bracket by a second upper bracket. A first driving device is provided between the first and second upper bracket to move the first upper bracket with respect to the second upper bracket. It will therefore be understood that through an actuation of the first driving device the upper main shaft is telescopically moved with respect to the lower main shaft to adjust the length of the steering shaft assembly.

The second upper bracket is mounted on the break-away bracket so that it can be moved in the shaft tilting direction with respect to the break-away bracket to produce a pivotable or a tilting movement of the lower main shaft. A second driving device is provided to drive the second upper bracket so that the lower main shaft is pivotably moved together with the first and second upper brackets and the first driving device.

In this known type of steering system, there are provided along the spline-connected upper and lower main shafts the first upper bracket, the second upper bracket supporting the first upper bracket and the break-away bracket supporting the second upper bracket. Further, there is provided between the first and second upper brackets the aforementioned first driving device which includes an electric motor for telescopically moving the upper main shaft with respect to the lower main shaft. There is also provided between the second upper bracket and the break-away bracket the aforementioned second driving device which includes an electric motor for tiltably moving the steering shafts. It is also necessary to provide an electric control circuit for controlling the operations of the electric motors.

The known arrangement is disadvantageous in that the driving device for the telescopic movements is located between the two movable brackets, namely, the first and second upper brackets. With this arrangement, an adverse effect has been experienced in the vibration absorbing characteristics of the steering system and vibrations has been transmitted from the vehicle body to the steering wheel.

SUMMARY OF THE INVENTION

It is therefore an object of the present invention to provide a tiltably and telescopically adjustable steering shaft mechanism in which driving means is located on a stationary bracket.

Another object of the present invention is to provide a tiltably and telescopically adjustable steering shaft mechanism in which common driving means is provided both for the shaft tilting movement and the telescopic movement.

According to the present invention, the above and other objects can be accomplished by stationary bracket means provided with a pair of screw shafts which are arranged in parallel with each other and engaged with nut members, respectively. The steering shaft assembly includes a lower main shaft which is journalled by the stationary bracket and an upper main shaft assembly having a first shaft portion connected with the lower main shaft for telescopic movements with respect to the lower main shaft through spline means and a second shaft portion connected with the first shaft portion through pivot means for pivotable movement about a pivot point with respect to the first shaft portion. Upper bracket means is provided on the upper main shaft assembly for mounting said nut members in a manner that a substantially transversely extending tilting axis passing through the pivot point is defined. The upper bracket means is secured to one of the shaft portions of the upper main shaft assembly and swingable about an axis aligned with said tilting axis when one of the nut members is axially moved upon rotation of the screw shaft with which the one nut member is rotated.

When the screw shaft engaged with said one nut member is rotatably driven, the said one nut member is moved so that the upper bracket means is swingably moved about the tilting axis together with the shaft portion to which the upper bracket means is secured. Thus, the second shaft portion of the upper main shaft assembly is tilted with respect to the first shaft portion. When the both of the screw shafts are rotated simultaneously, the upper bracket means is moved in the axial direction of the lower main shaft so that a telescopic movement is produced in the upper main shaft assembly with respect to the lower main shaft.

According to a further feature of the present invention, drive means is provided to drive the screw shaft which is engaged with the said other nut member. Torque transmitting means is provided between the two screw shafts and includes a clutch means for selectively interrupting torque transmittal between the two screw shafts. The operation of the clutch means can be controlled by an electric signal produced by an appropriate control means. It will therefore be understood that both the tilting movement and the telescopic movement can be produced by only a single driving means.

The above and other objects and features of the present invention will become apparent from the following descriptions of a preferred embodiment taking reference to the accompanying drawings.

DESCRIPTION OF THE PREFERRED EMBODIMENT

Figure 1:
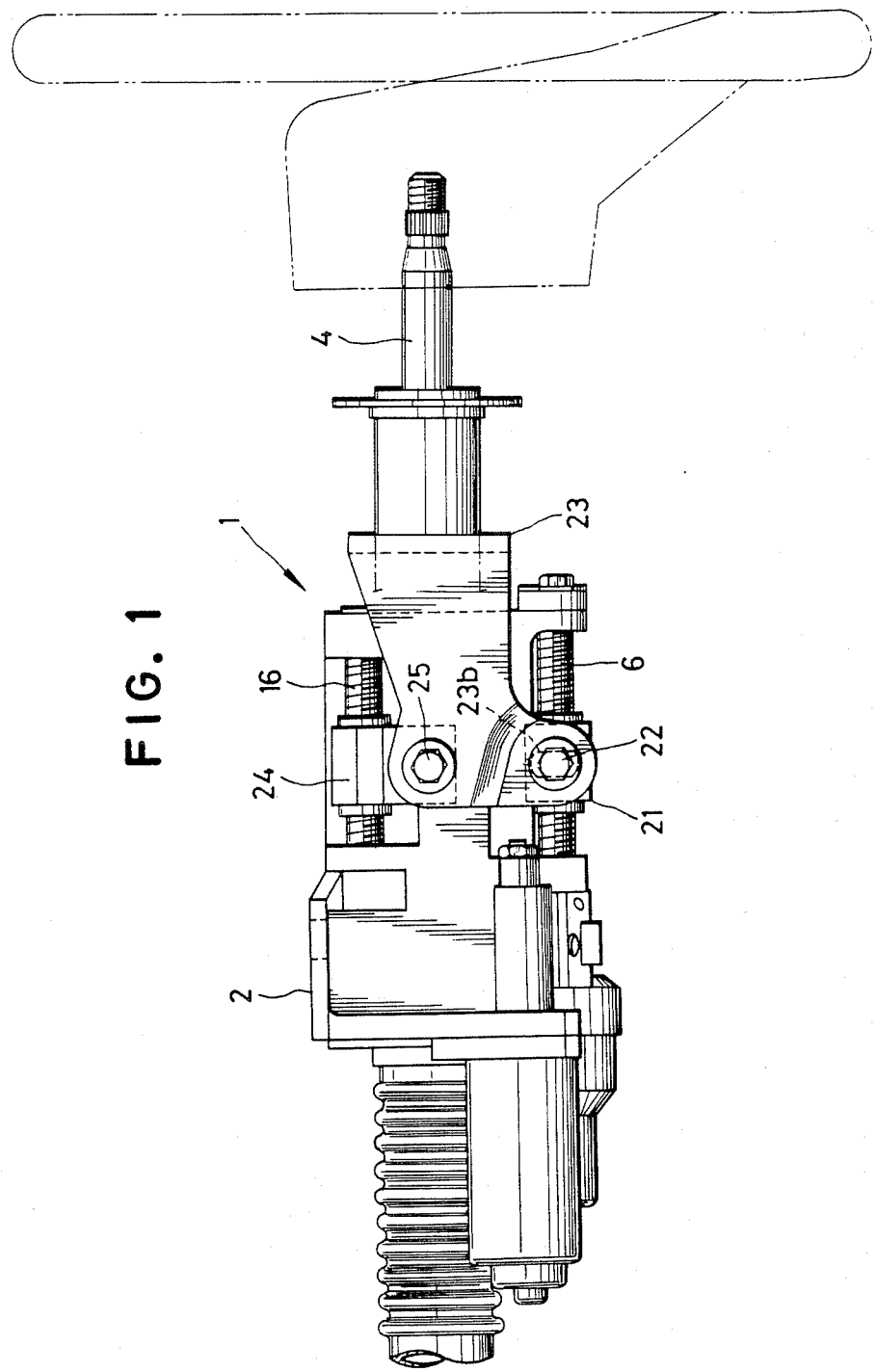
FIG. 1 is a side view of a steering shaft assembly in accordance with one embodiment of the present invention.

Referring to the drawings, there is shown a steering shaft assembly 1 including a break-away bracket 2 which is adapted to be mounted on a vehicle body (not shown) and a lower main shaft 3 which is journalled by the bracket 2. There is provided an upper main shaft assembly 4 which includes a first shaft portion 4a which is connected with the lower main shaft 3 for telescopic movement with respect thereto through splines. The upper main shaft assembly 4 further includes a second shaft portion 4b which is connected with the first shaft portion 4a through a universal joint 5 having a center or a pivot point 5a.

Figure 2:
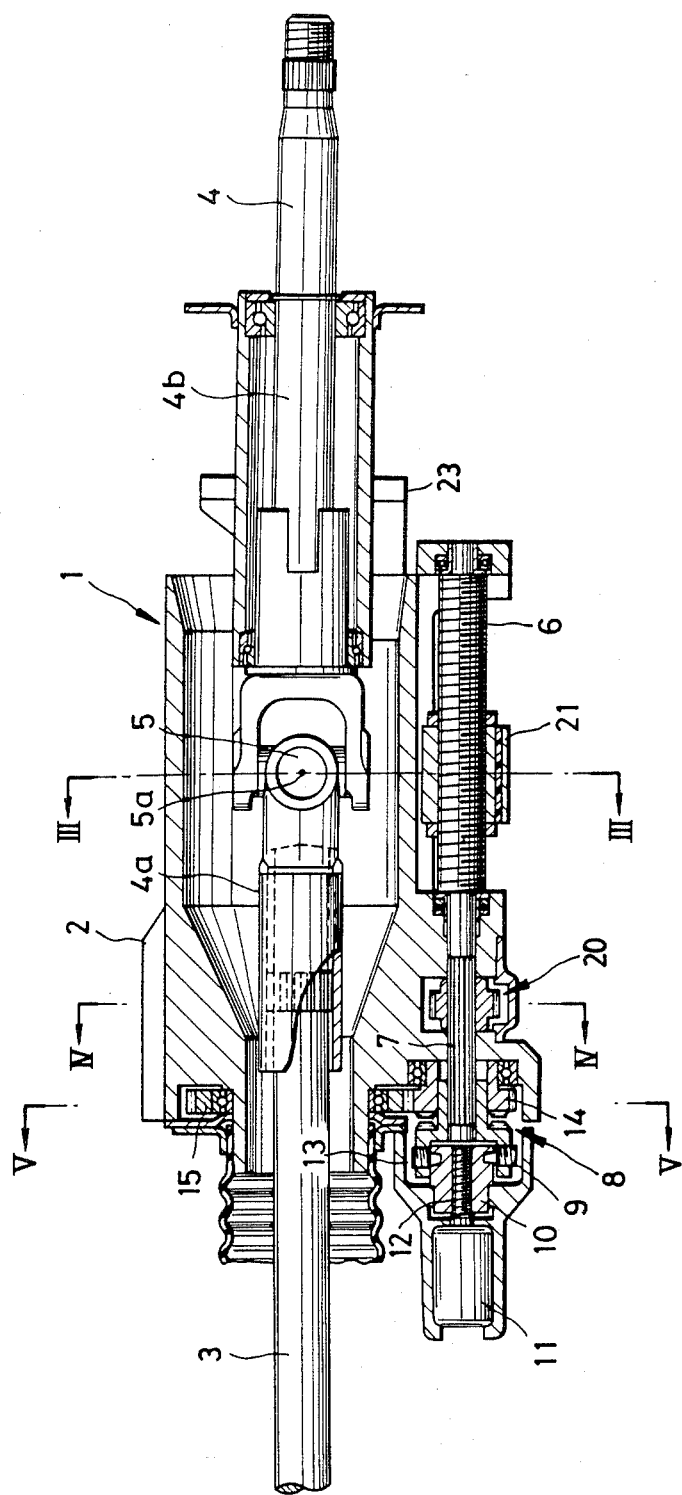
FIG. 2 is a longitudinal sectional view of the steering shaft assembly shown in FIG. 1.

The break-away bracket 2 carries a first screw shaft 6 for rotation. The first screw shaft 6 is held on the bracket 6 immovably in the axial direction. As shown in FIG. 2, the screw shaft 6 extends through the bracket 2 and is formed at an end portion 7 with spline teeth. Adjacent to the splined end 7 of the screw shaft 6, there is provided a clutch 8 which includes clutch members 13 and 14. The screw shaft 6 is secured to the clutch member 13 which has pins 9 engaged with a circumferential groove formed in a nut 10. A clutch motor 11 is provided and has a screw shaft 12 which is the output shaft of the motor. The nut 10 is engaged with the screw shaft 12 of the motor 11 so that the nut 10 is axially moved as the motor 11 is operated. When the nut 10 is moved leftward in the plane of FIG. 2, the clutch member 13 of the clutch 8 is disengaged from the clutch member 14 so that the clutch 8 is disconnected. When the nut 10 is moved rightward, the clutch member 13 is engaged with the clutch member 14 so that the clutch 8 is connected. As long as the clutch 8 is disconnected, the rotation of the screw shaft 6 is not transmitted from the clutch member 13 to the clutch member 14. Further, the clutch member 13 is rotated freely with respect to the nut 10 because the pins 9 simply slides in the circumferential groove in the nut 10.

Figure 5:
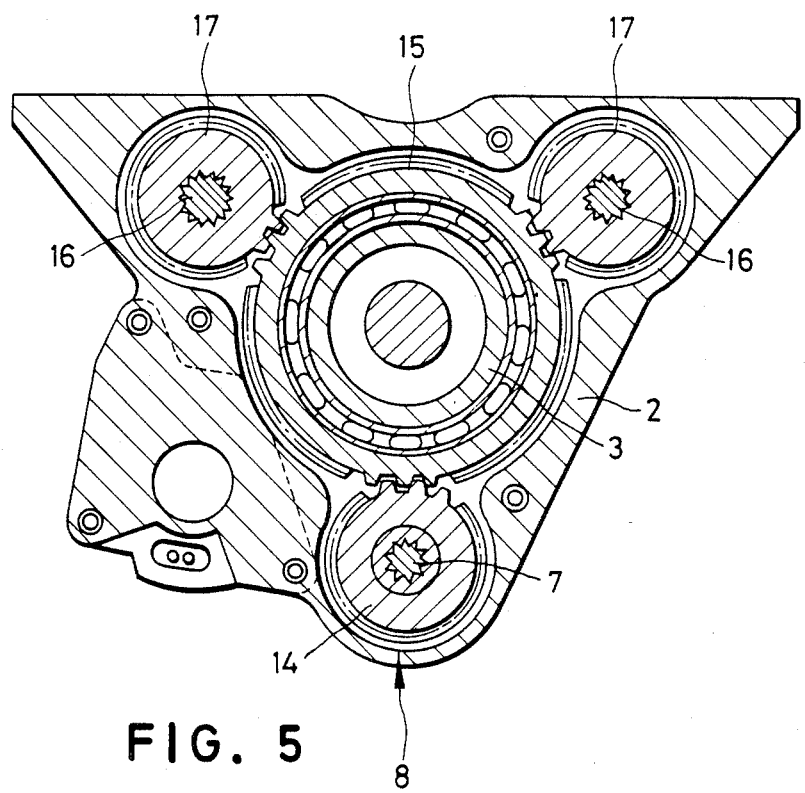

Referring to FIG. 5, it will be noted that the clutch member 14 is supported by the break-away bracket 2 and has external gear teeth which are engaged with gear teeth formed on an idler gear 15 provided coaxially with respect to the lower main shaft 3. The break-away bracket 2 further carries gears 17 which are engaged with the idler gear 15. Referring to FIG. 1 together with FIG. 5, it will be noted that second screw shafts 16 are provided in parallel with the first screw shaft 6 and rotatably supported by the bracket 2. The screw shafts 16 are respectively connected with the gears 17. It will therefore be understood that when the clutch 8 is engaged, the rotation of the first screw shaft 6 is transmitted through the gears 15 and 17 to the second screw shafts 16. It should be noted that the gear mechanism may be substituted by a belt-pulley mechanism.

Figure 4:
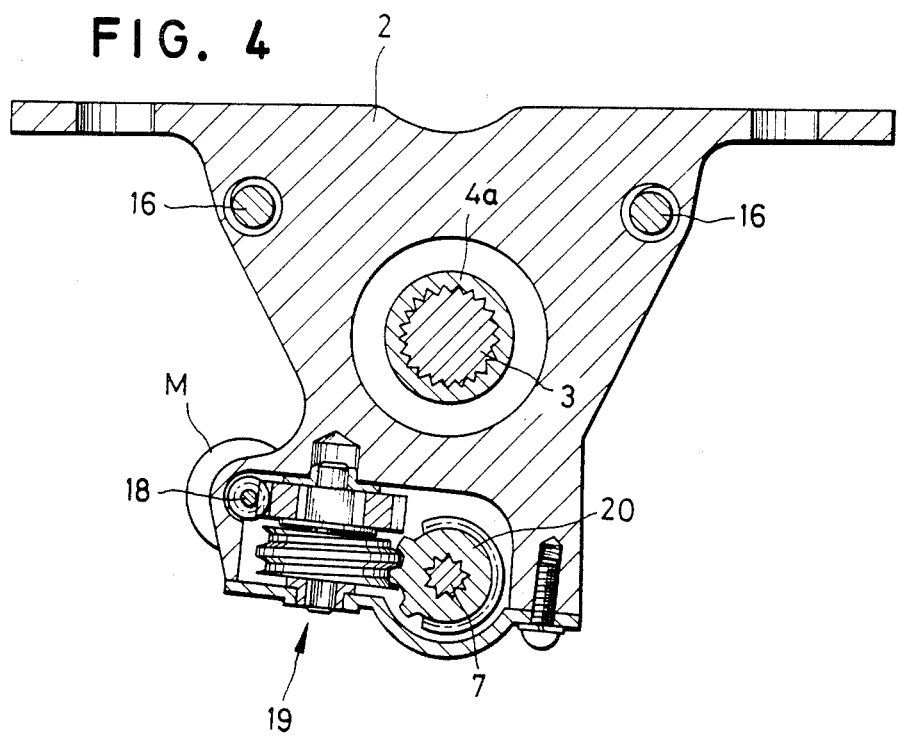
FIG. 4 is a sectional view taken substantially along the line IV—IV in FIG. 2; and, FIG. 5 is a sectional view taken substantially along the line V—V in FIG. 2.

Referring now to FIG. 4, it will be noted that a driving motor M is mounted on the break-away bracket 2 and has an output shaft 18 which is connected through a speed reduction mechanism 19 with a gear 20 which is secured to the splined end portion 7 of the screw shaft 6. It will therefore be understood that the screw shaft 6 is rotated by the driving motor M through the speed reduction mechanism 19 and, when the clutch 8 is engaged, the rotation of the screw shaft 6 is transmitted through the clutch 8 and the gears 15 and 17 to the second screw shafts 16. When the clutch 8 is disengaged, the rotation of the driving motor M rotates only the screw shaft 6.

Figure 3:
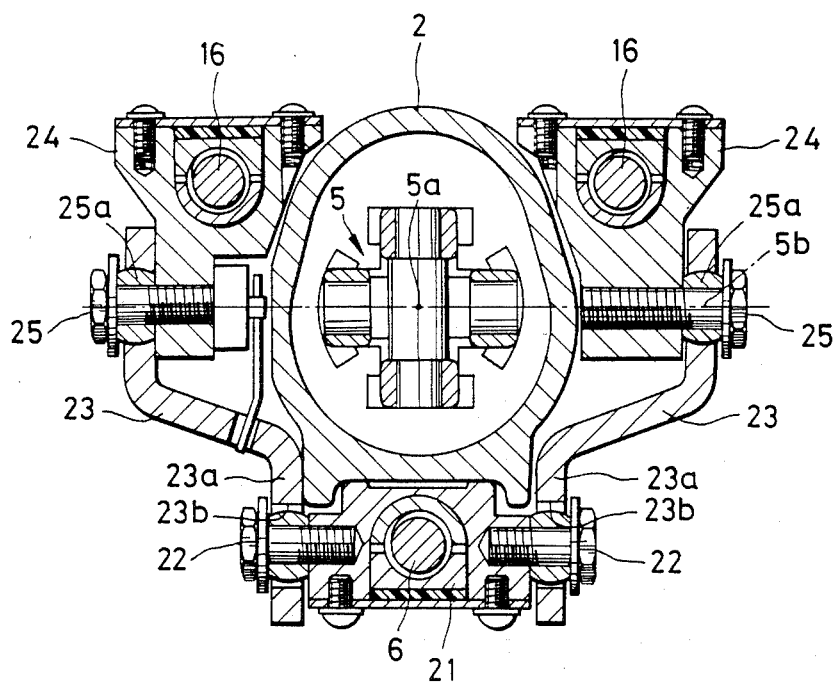
FIG. 3 is a sectional view taken substantially along the line III—III in FIG. 2.

In FIGS. 1 through 3, it will be noted that a first nut member 21 is engaged with the first screw shaft 6 and second nut members 24 are engaged with the second screw shafts 16. An upper bracket 23 is secured to the second shaft portion 4b of the upper shaft assembly 4 and has its opposite side flanges 23a formed with vertically elongated slots 23b. The first nut member 21 is supported by the upper bracket 23 by means of bolts 22 engaged with the slots 23b in the flanges of the upper bracket 23. The second nut members 24 are connected with the upper bracket 23 through bolts 25 having spherical bearings 25a arranged on a transverse tilting axis 5b passing through the pivot point 5a of the universal joint 5. It will therefore be understood that the upper bracket 23 and the second shaft portion 4b of the upper main shaft assembly 4 are swingable with respect to the first shaft portion 4a about the tilting axis 5b.

In operation, when a tilting operation is commanded, the clutch motor 11 is not energized so that the clutch 8 is maintained in the disconnected position. When it is detected by a suitable detecting device that the clutch 8 is disconnected, the driving motor M is energized so that the first screw shaft 6 is rotated through the speed reduction gear mechanism 16. Thus, the first nut member 21 is moved in the axial direction of the shaft portion 4b of the upper main shaft assembly 4 so that the upper bracket 23 and the second shaft portion 4b are swingably moved with respect to the first shaft portion 4a producing a tilting movement of the shaft portion 4b about the tilting axis 5b.

When it is commanded to produce a telescopic movement of the upper main shaft assembly 4 with respect to the lower shaft 3, the clutch motor 11 is energized so that the clutch 8 is connected. Thus, the rotation of the driving motor M is transmitted through the speed reduction mechanism 16 to the first screw shaft 6 and then from the first screw shaft 6 through the clutch 8 and the gears 15 and 17 to the second screw shafts 16. Thus, the nut members 21 and 24 are moved in the axial direction of the lower main shaft 2 to produce a telescopic movement of the upper main shaft assembly 4 with respect to the lower main shaft 2.

According to the mechanism described above, a single driving motor can drive both the first screw shaft 6 and the second screw shafts 16 so that the weight of the steering shaft assembly can be reduced. The arrangement in which the first screw shaft is positioned beneath the upper shaft assembly and the second screw shafts are positioned above the upper shaft assembly is advantageous in that the diameter of the tilting mechanism is not necessarily increased.

The invention has thus been shown and described with reference to a specific embodiment, however, it should be noted that the invention is in no way limited to the details of the illustrated structures but changes and modifications may be made without departing from the scope of the appended claims.

We claim:

1. A tiltable and telescopically extensible steering shaft assembly including lower main shaft means, stationary bracket means journalling the lower main shaft means, upper main shaft means having a first shaft portion connected with said lower main shaft means for telescopic movements with respect to the lower main shaft means through spline means and a second shaft portion connected with said first shaft portion for pivotable movements with respect to the first shaft portion through pivot means having a pivot point, first screw shaft means rotatably carried by said stationary bracket means and engaged with first nut means, second screw shaft means rotatably carried by said stationary bracket means and engaged with second nut means, upper bracket means provided on said second shaft portion of the upper shaft means and connected with the second nut means for pivotable movements with respect to the second nut means about a transverse tilting axis passing through the pivot point and extending in a transverse direction, said first nut means being carried on said upper bracket means so that a rotation of the first screw shaft means produces an axial movement of the first nut means causing a tilting movement of the second shaft portion of the upper main shaft means and rotations of the first and second screw shaft means produce axial movements of the first and second nut means causing telescopic movement of the upper main shaft means with respect to the lower main shaft means.

2. A steering shaft assembly in accordance with claim 1 in which driving motor means is provided for driving said first and second screw shaft means.

3. A steering shaft assembly in accordance with claim 1 in which clutch means is provided for transmitting rotation between the first and second screw shaft means, driving motor means for driving said first screw shaft means, means for controlling engagement of the clutch means.

4. A steering shaft assembly in accordance with claim 1 in which said first screw shaft means includes a screw shaft and said second screw shaft means includes a pair of screw shafts.

5. A steering shaft assembly in accordance with claim 4 in which said screw shaft of the first screw shaft means is located beneath the upper shaft means and the screw shafts of the second screw shaft means are located above the upper shaft means.

6. A steering shaft assembly in accordance with claim 3 in which said driving motor means is mounted on the stationary bracket means.

7. A tiltable and telescopically extensible steering shaft assembly including lower main shaft means, stationary bracket means journalling the lower main shaft means, upper main shaft means having a first shaft portion connected with said lower main shaft means for telescopic movements with respect to the lower main shaft means through spline means and a second shaft portion connected with said first shaft portion for pivotable movements with respect to the first shaft portion through pivot means having a pivot point, first screw shaft means rotatably carried by said stationary bracket means and engaged with first nut means, second screw shaft means rotatably carried by said stationary bracket means and engaged with second nut means, upper bracket means provided on said second shaft portion of the upper shaft means and connected with one of the first and second nut means for pivotable movements with respect to said one nut means about a transverse tilting axis passing through the pivot point and extending in a transverse direction, driving means for rotating said first screw shaft means, clutch means provided between said first screw shaft means and said second screw shaft means for transmitting rotation between said first and second screw shaft means, the other of said first and second nut means being carried on said upper bracket means so that an operation of the driving means produces an axial movement of the first nut means causing a tilting movement of the second shaft portion of the upper main shaft means when the clutch means is disengaged and an operation of the driving means produce axial movements of the first and second nut means causing telescopic movement of the upper main shaft means with respect to the lower main shaft means when the clutch means is engaged.

* * * * *